United States Patent [19]

Maruyama

[11] Patent Number: 4,718,718

[45] Date of Patent: Jan. 12, 1988

[54] TRIM COVER FOR USE WITH SEATS IN VEHICLES

[75] Inventor: Hidekazu Maruyama, Ayase, Japan

[73] Assignee: Ikeda Bussan Co., Ltd., Ayase, Japan

[21] Appl. No.: 894,880

[22] Filed: Aug. 8, 1986

[30] Foreign Application Priority Data

Aug. 9, 1985 [JP] Japan .............................. 60-122435[U]

[51] Int. Cl.$^4$ ................................................ A47C 7/74
[52] U.S. Cl. .................................... 297/180; 297/219;
297/452; 297/DIG. 1
[58] Field of Search ......... 297/180, 219, 218, DIG. 1,
297/DIG. 2, 452; 5/471, 470

[56] References Cited

U.S. PATENT DOCUMENTS

| | | | |
|---|---|---|---|
| 3,630,572 | 12/1971 | Homier | 5/471 |
| 3,727,980 | 4/1973 | Tischler | 297/452 |
| 4,379,352 | 4/1983 | Hauslein et al. | 297/452 |
| 4,558,905 | 12/1985 | Natori | 297/452 |
| 4,579,389 | 4/1986 | Shimtori et al. | 297/452 |
| 4,606,580 | 8/1986 | Yoshizawa | 297/DIG. 1 |

Primary Examiner—Francis K. Zugel
Attorney, Agent, or Firm—Schwartz, Jeffery, Schwaab, Mack, Blumenthal & Evans

[57] ABSTRACT

A trim cover for use with seats in vehicles and having an electric heater housed therein wherein seams each for binding its surface skin and base cloth together are formed at the sitting area of the trim cover in the longitudinal direction thereof to form an appropriate number of elongated sack-like portions between the surface skin and the base cloth, a pulling loop traverse the sack-like portions at the middle thereof is joined together with the surface skin and the base cloth, a pair of openings are formed at the middle of each of the sack-like portions, interposing the pulling loop between the paired openings, a through-hole is provided at that portion of the pulling loop which is located between the paired openings, each of band-like portions of the electric heater is inserted through its corresponding sack-like portion, passing through the paired openings and the through-hole in the pulling loop between the paired openings, and a pulling wire is passed through the pulling loop.

6 Claims, 6 Drawing Figures

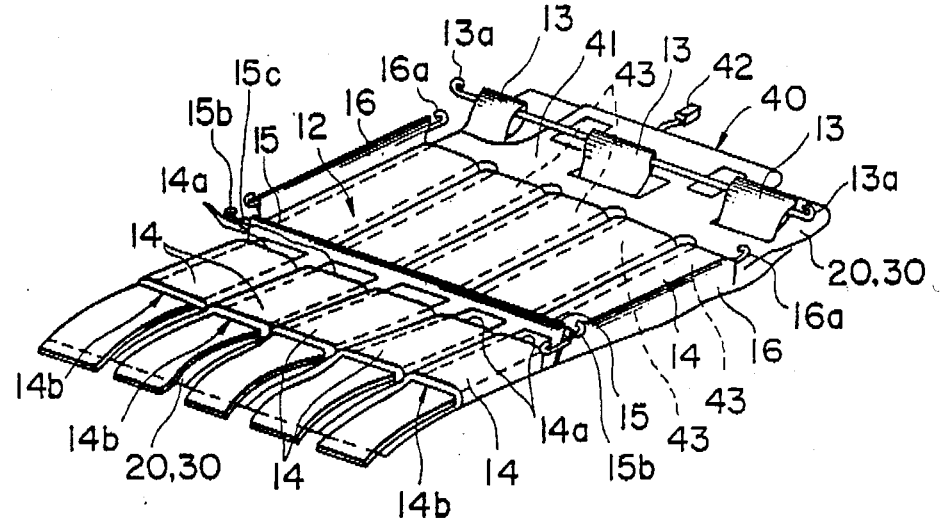
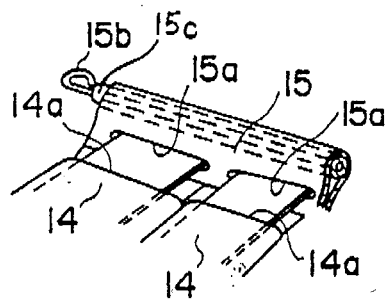
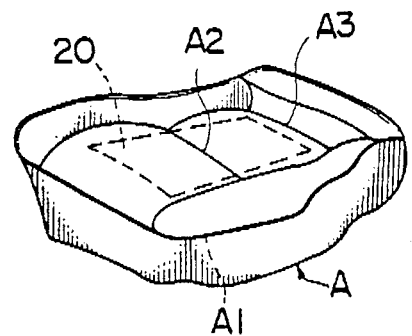
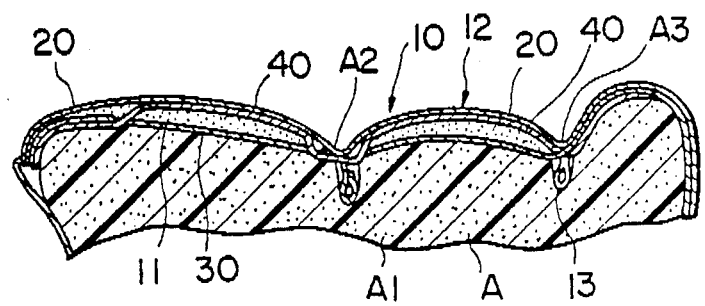

TRIM COVER FOR USE WITH SEATS IN VEHICLES

BACKGROUND OF THE INVENTION

1. Field of the Invention

The present invention relates to a trim cover for use with seats in vehicles, the trim cover being shaped to cover the cushion of a seat, sandwiching a wadding between its surface skin and a base cloth, and housing an electric heater therein.

2. Description of the Prior Art

A conventional trim cover for use with seats in vehicles and having an electric heater therein is shown in FIGS. 1 and 2.

The trim cover 1 is divided to form a plurality of elongate sack-like portions 4 between its surface skin 2 and base cloth 3. A band-like portion 5a of the electric heater 5, whose length corresponds substantially to the length of each of the sack-like portions 4, is inserted into each of the sack-like portions 4. Loops 6 are arranged side by side in the transverse direction of the trim cover 1 and in front of the band-like portions 5a of the electric heater 5. When the trim cover 1 is to be attached to the seat cushion, a pulling wire 6a passing through the loops 6 is pulled downward together with another pulling wire 7a which passes through loops 7 arranged at the back of the trim cover 1, thereby forming grooved lines 8 and 9 at the front and back of the trim cover 1.

In such a conventional trim cover, however, the loops 6 and 7 are separated from one another by the elongated band-like portions 5a of the electric heater 5 so that the distance between the grooved lines 8 and 9 is relatively long. The grooved line 8 is thus near the front end of the seat cushion and the position of the hip point, at which a load is applied, is remote from the grooved line 8. When the trim cover 1 is repeatedly used, therefore, its surface skin loosens and the cushion cannot be shaped so as to make the user feel confortable.

SUMMARY OF THE INVENTION

The present invention is therefore intended to eliminate the above-mentioned drawbacks.

Accordingly, the object of the present invention is to provide a trim cover for use with seats in vehicles wherein the grooved lines are formed at appropriate positions on the seat cushion to solve the above-mentioned problems.

The objects of the present invention can be achieved by a trim cover for use with seats in vehicles shaped to cover the cushion of a seat, which sandwiches a kind of wadding between its surface skin and base cloth and which houses an electric heater provided with seams for binding the surface skin and the base cloth together in the longitudinal direction at that area of the trim cover where the driver or other person will sit so as to form an appropriate number of elongated sack-like portions between the surface skin and the base cloth of the trim cover. The trim cover further includes a pulling loop transverse to the sack-like portions at the middle thereof joined with the surface skin and the base cloth, and a pair of openings formed at the middle of the sack-like portions, with the pulling loop interposed between the paired openings. A through-hole is formed at that portion of the pulling loop which is located between the paired openings, and each of band-like portions of the electric heater is inserted through its corresponding sack-like portion, through the paired openings and the through-hole of the pulling loop between the paired openings. A pulling wire is passed through the pulling loop.

When the trim cover is arranged as described above and the pulling wire which is passed through the pulling loop at the middle of the sack-like portions is pulled downward, a grooved line can be formed remote from the front end of the seat cushion but at an appropriate position on the seat cushion, thereby preventing the surface skin from loosening and adapting the seat for comfortable seating.

BRIEF DESCRIPTION OF THE DRAWINGS

FIG. 3 is a perspective view showing an example of the trim cover according to the present invention;

FIG. 4 is a perspective view showing the main portion of a pulling loop which is fixed at the middle of the trim cover shown in FIG. 3;

FIG. 5 is a perspective view showing the seat cushion onto which the trim cover of the present invention is attached; and FIG. 6 is a sectional view showing the seat cushion shown in FIG. 5.

DETAILED DESCRIPTION OF THE PREFERRED EMBODIMENT

Figure 1:
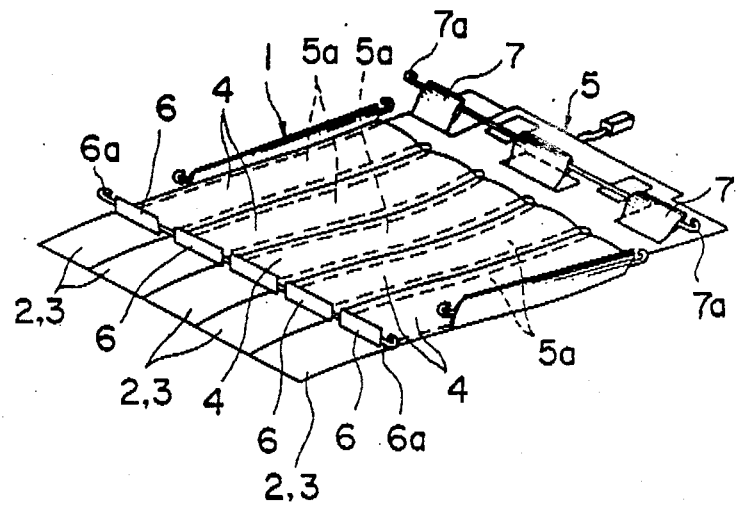
FIG. 1 is a perspective view showing an example of the conventional trim cover.
Figure 2:
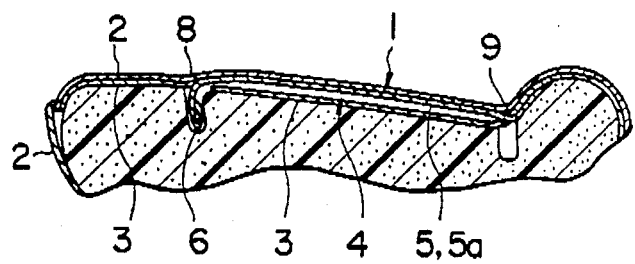
FIG. 2 is a sectional view showing a part of the seat cushion onto which the conventional trim cover is attached.

FIGS. 3 through 6 show an embodiment of the present invention.

A trim cover 10 is shaped to cover a seat cushion (A) and a wadding 11 is sandwiched between a surface skin 20 and a base cloth 30. An electric heater 40 is further housed therein, contacting the surface skin 20 tightly.

The base of each of pulling loops 13 is sewn together with the surface skin 20 and the base cloth at the back of the surface skin 20 which corresponds to the back of sitting area 12 of trim cover 10 which corresponding to the sitting area of the seat cushion (A). A pulling wire 13a can be passed through the pulling loops 13.

The surface skin 20 and the base cloth 30 are linearly sewn together at the sitting area of the trim cover 10 in the longitudinal direction thereof from a plurality of elongated sack-like portions 14 between the surface skin 20 and the base cloth 30. A pulling loop 15 transverse to the sack-like portions 14 at the middle thereof is seamed together with the surface skin 20. A pair of openings 14a are formed at the middle of each of the sack-like portions 14 for interposing the pulling loop 15 between them.

As shown in FIG. 4, a through-hole 15a is provided at that portion of the pulling loop 15 which is located betwen the paired openings 14a, and pulling wire 15b can be passed through the pulling loop 15.

Side pulling loops 16 are sewn together with the surface skin 20 and the base cloth 30 at both sides of the sitting area 12 of the trim cover 10 and a pulling wire 16a can be passed through each of these pulling loops 16.

An electric heater 40 comprises heating wires in an outer skin and these heating wires are collected at a back end 41 and connected to a plug 42. The pulling loops 13 are passed through openings or cut-away portions, respectively, at the back end 41 of the trim cover 10. Each of band-like portions 43 of the electric heater 40 extends forward from the back end 41 and is inserted through its corresponding sack-like portion 14, a pair of openings 14a and a through-hole 15a in the pulling loop 15 between the paired openings 14a, projected beyond an opening 14b at the front end of the sack-like portion 14 and extended to the front end of the sitting area 12.

When the trim cover 10 is to be attached to the seat, its sitting area 12 is spread to correspond to the sitting area of the seat cushion (A) and to cover a cushion pad A1. The trim cover 10 is fixed at its outer circumferential rim and the wires 13a, 15b and 16a are pulled downward together with their loops 13, 15 and 16; and are hooked to a cushion frame (not shown), as shown in FIG. 6.

The surface skin 20 is thus pulled inward by the pulling wires 13a and 15b through their loops 13 and 15, and grooved lines A2 and A3 can be formed at appropriate front and back positions on the seat cushion (A), as shown in FIG. 5.

The driver or other person can sit on the trim cover or seat, with his thighs supported by a swelled portion in front of the grooved line A2 and his hip supported by another swelled portion between the grooved lines A2 and A3. If necessary, he can warm himself by heating the electric heater 40 through the plug 42.

The pulling wire 15b is covered with rubber 15c to prevent the wire 162 from striking against and rubbing the heater 40 when the driver or other person sits on the seat.

Although the present invention has been described with reference to the preferred embodiment, it should be understood that the present invention is not limited to this embodiment but various changes and modification can be made without departing from the scope and spirit of the present invention.

What is claimed is:

1. A trim cover for covering a seat cushion of a seat in a vehicle, comprising:
    a surface skin;
    a base cloth connected to said surface skin;
    wadding sandwiched between said surface skin and said base cloth;
    an electric heater comprising a plurality of band-like portions;
    a plurality of elongated sack-like portions formed between said surface skin and said base cloth, each sack-like portion being separated from adjacent sack-like portions by seams which bind said surface skin and said base cloth together, each sack-like portion receiving one of said plurality of band-like electric heater portions and having an opening formed intermediate its length;
    a pulling loop traversing said plurality of sack-like portions at their openings, said pulling loop being joined together with said surface skin and said base cloth and having a plurality of through-holes permitting passage therethrough of said plurality of band-like electric heater portions, whereby each band-like portion extends from a respective sack-like portion on one side of a through-hole, through said through-hole and into the sack-like portion on the other side of said through-hole; and
    a pulling wire passed through said pulling loop for securing the trim cover to the seat cushion.

2. A trim cover as claimed in claim 1, wherein the pulling wire is covered with rubber to prevent harmful contact with said electric heater.

3. A trim cover as claimed in claim 1 and further comprising a plurality of side pulling loops sewn together with said surface skin and said base cloth, each of said side pulling loops being positioned at an outer edge of one of the outermost of said sack-like portions and having a pulling wire passed through it for attachment to the seat.

4. A seat for a vehicle, comprising:
    a seat cushion; and
    a trim cover for covering said seat cushion comprising a surface skin, a base cloth connected to said surface skin, wadding sandwiched between said surface skin and said base cloth, an electric heater comprising a plurality of band-like portions, a plurality of elongated sack-like portions formed between said surface skin and said base cloth, each sack-like portion being separated from adjacent sack-like portions by seams which bind said surface skin and said base cloth together, each sack-like portion receiving one of said plurality of band-like electric heater portions and having an opening formed intermediate its length, a pulling loop traversing said plurality of sack-like portions at their openings, said pulling loop being joined together with said surface skin and said base cloth and having a plurality of through-holes permitting passage therethrough of said plurality of band-like electric heater portions, whereby each band-like portion extends from a respective sack-like portion on one side of a through-hole, through said through-hole and into the sack-like portion on the other side of said through-hole, and a pulling wire passed through said pulling loop for securing the trim cover to the seat cushion.

5. A seat as claimed in claim 4, wherein said pulling wire is covered with rubber to prevent harmful contact with said electric heater.

6. A seat as claimed in claim 4 and further comprising a plurality of side pulling loops sewn together with said surface skin and said base cloth, each of said side pulling loops being positioned at an outer edge of one of the outermost of said sack-like portions and having a pulling wire passed through it for attachment to the seat.

* * * * *